United States Patent
Maichel et al.

(10) Patent No.: US 7,021,325 B2
(45) Date of Patent: Apr. 4, 2006

(54) VALVE ASSEMBLY AND METHOD FOR HOT TAPPING A LINE

(75) Inventors: Jeffrey L. Maichel, Temecula, CA (US); Thomas A. Sovilla, La Habra, CA (US)

(73) Assignee: Occlude, La Mirada, CA (US)

( * ) Notice: Subject to any disclaimer, the term of this patent is extended or adjusted under 35 U.S.C. 154(b) by 24 days.

(21) Appl. No.: 10/893,634

(22) Filed: Jul. 16, 2004

(65) Prior Publication Data

US 2005/0150550 A1    Jul. 14, 2005

Related U.S. Application Data

(63) Continuation-in-part of application No. 10/753,726, filed on Jan. 8, 2004, now abandoned.

(51) Int. Cl.
*F16K 43/00* (2006.01)

(52) U.S. Cl. ............... 137/15.12; 137/15.17; 137/315.11; 137/315.22; 137/320; 137/323; 251/305

(58) Field of Classification Search ......... 137/320, 137/318, 317, 323, 15.12, 15.17, 315.11, 137/315.22, 315.24; 251/305, 306
See application file for complete search history.

(56) References Cited

U.S. PATENT DOCUMENTS

| 2,936,778 A | | 5/1960 | Stillwagon |
| 4,460,012 A | | 7/1984 | Koumi et al. |
| 4,562,860 A | | 1/1986 | Walter et al. |
| 5,896,885 A | * | 4/1999 | Svetlik ............. 137/318 |
| 6,497,245 B1 | * | 12/2002 | Torii ............... 251/306 |

* cited by examiner

*Primary Examiner*—Kevin Lee
(74) *Attorney, Agent, or Firm*—Loyal McKinley Hanson (57) ABSTRACT

A valve assembly includes a valve body with an access opening in which a linearly installed but pivotally operated gate-like valve-stopping mechanism is disposed, said mechanism including a support structure or cartridge with a pivotally moveable valve-stopping element or isolator (e.g., a butterfly element). A method for hot tapping a pipeline with a valve assembly as described above proceeds by (i) connecting the valve body to a line to be tapped, (iii) connecting a hot-tapping machine to the valve body, (iv) connecting a bonnet holding the valve-stopping mechanism to the valve body over the access opening, (v) hot tapping the line, (vi) advancing the valve-stopping mechanism into the valve body interior, and (vii) disconnecting the hot-tapping machine from the valve body with the valve-stopping element pivoted to the first position where it stops fluid communications. The gate-like valve-stopping mechanism can replace a gate in an insert valve (IV) or a repair-under-pressure (RUP) valve.

16 Claims, 10 Drawing Sheets

VALVE ASSEMBLY AND METHOD FOR HOT TAPPING A LINE

CROSS REFERENCE TO RELATED APPLICATION

This application is a continuation in part of U.S. patent application Ser. No. 10/753,726 filed Jan. 8, 2004, now abandoned.

BACKGROUND OF THE INVENTION

1. Technical Field

This invention relates generally to procedures and equipment for hot tapping a pipeline, and more particularly to a valve assembly and hot-tapping method that provide increased component flexibility in addition to size, weight, and cost advantages.

2. Description of Related Art

"Hot tapping" refers to the procedures and equipment a worker employs to add a branch connection to an existing pipeline while the existing pipeline contains a fluid (often pressurized) without shutting down service. Any size and type of pipeline may be involved. To hot tap a line, the worker bolts or welds a fitting on a section of pipe in the line to form a tapping outlet structure (e.g., a flange). Next, he takes a conventional gate valve or other suitable hot-tapping valve and bolts the upstream end of the valve body on the tapping outlet.

Once the tapping valve is mounted on the pipe, he bolts a conventional hot-tapping machine to the downstream end of the valve body. The hot-tapping machine typically includes a motorized hole saw for sawing a hole in the pipe. After mounting it and pressure testing the hookup, the worker advances the hole saw through the body of the tapping valve with the valve-stopping element (i.e., the gate of the valve) in an open position. Next, he saws a hole in the wall of the pipe.

After forming the hole, the worker proceeds by retracting the hole saw sufficiently to close the valve-stopping element of the tapping valve. He closes it and then removes the tapping machine. That leaves the closed tapping valve connected to the pipeline and ready for service, and he may then connect a pipe, gauge, sensor, or other component to the downstream side of the valve body and open the valve when desired.

Hot tapping a line that way is well known. However, the size, weight, and expense of the gate valve employed can present problems, especially for 24-inch to 48-inch and larger pipelines. U.S. Pat. No. 5,660,199 addresses the problems with a hot-tapping method employing a valve that is similar in some respects to a conventional bonneted gate valve but which includes a bonnet isolating mechanism. After bolting the valve body to a hot-tapping outlet on the pipeline and then hot tapping the line through the valve body, the worker closes the valve, removes the hot-tapping machine, and connects a desired downstream component. Then, he completes the hot-tapping procedure recited in that patent by opening the valve to withdraw the gate fully into the bonnet, actuating the bonnet isolating mechanism to seal the valve body from the bonnet, and removing the bonnet from the valve body.

That way of doing it leaves just the smaller, lighter, and less expensive valve body connected to the pipeline, along with whatever downstream components are connected to the valve body. So, the hot-tapping procedure enables use of most any downstream component, including butterfly valves, globe valves, check valves, back flow preventers, gauges, sensors, and no-valve technologies. In addition, the larger, heavier, and more expensive bonnet is free for reuse elsewhere, and a bonnet can always be reattached to the valve body whenever desired in the future for pipeline servicing.

Although effective in many respects, the valve body cannot be re-isolated without reconnecting the bonnet and gate, and in many cases doing so requires excavation around the valve body. Moving the gate linearly in and out of the valve body requires significant space, especially for 24-inch to 48-inch and larger pipelines. Thus, a need exists for a better way for hot tapping an existing pipeline.

SUMMARY OF THE INVENTION

This invention addresses the concerns outlined above by providing a valve assembly having a linearly installed but pivotally operated valve-stopping mechanism. A preferred embodiment includes a valve-stopping mechanism in the form of an insert-able butterfly cartridge that inserts linearly into the valve body something like the gate of a gate valve. Once inserted, a butterfly valve-stopping element (or isolator), that is mounted pivotally on the cartridge, is pivoted in order to open and close the valve. Thus, the space required for moving a gate linearly into and out of the valve body is not needed to open and close the valve.

To paraphrase some of the more precise language appearing in the claims and introduce the nomenclature used, a valve assembly constructed according to the invention includes a valve body having first and second ends and a hollow valve body interior extending along a first axis between the first and second ends. The valve body has an opening-defining portion that defines an access opening providing access to the hollow valve body interior along a second axis that intersects the first axis (e.g., perpendicular axes). A valve-stopping mechanism mounts removably in the valve body through the access opening, something like the gate of a gate valve.

The gate-like valve-stopping mechanism includes both a valve-stopping-element support structure that is mounted removably within the hollow valve body interior (also referred to as an isolator retaining mechanism), and a valve-stopping element (e.g., a butterfly element) that is mounted on the support structure. The support structure defines a fluid-communications-providing opening through it, and it moves through the access opening linearly along the second axis to a position within the hollow valve body interior intermediate the first and second ends where it stops fluid communications except through the fluid-communications-providing opening through the support structure. The valve-stopping element is mounted pivotally on the valve-stopping-element support structure for pivotal movement about the second axis so that a user can pivot it between a first pivotal position of the valve-stopping element in which the valve-stopping element stops fluid communications between the first and second ends through the fluid-communications-providing opening and a second pivotal position of the valve-stopping element in which the valve-stopping element does not stop such fluid communications.

In one embodiment, the valve-stopping element takes the form of a butterfly element. In addition, an isolator plate or flap plate mechanism is provided that enables a user to selectively open and close the access opening, and a cover plate mounts removably on the opening-defining portion of the valve body in a position over the access opening. Preferably, the valve-stopping mechanism includes a base material that can be at least partially rubber encapsulated for sealing purposes.

In line with the above, a method for hot tapping a pipeline with a valve assembly as described above proceeds by (i) connecting the valve body to a line to be tapped, connecting a hot-tapping machine to the valve body, and connecting a bonnet holding the valve-stopping mechanism to the valve body over the access opening. Next, the hole saw is operated to hot tap the line. Then, the valve-stopping mechanism is advanced into the valve body interior. After that, the valve-stopping element pivoted to the first position where it stops fluid communications and then the hot-tapping machine is disconnected from the valve body.

Thus, the invention overcomes the gate-valve problems described above. The valve-stopping element pivots instead of moving linearly into and out of the valve body so that the space otherwise required by a gate valve to open and close the valve is not needed. The user has the ability to change, repair, or replace the valve's stopping mechanism, at a later date after the hot tapping process had taken place, without interrupting the pipeline system.

Unlike the assembly 27 shown in U.S. Pat. No. 2,936,778, the valve-stopping mechanism of this invention is not designed for use in the food handling industry to provide ease of disassembly for cleaning purposes (something very important in the food industry). It does not require shutdown of the line for insertion and removal, and it does not fall apart into multiple component parts when removed from the valve body. The valve-stopping mechanism of this invention is a gate-like structure in the sense that it is a unit that is shaped and dimension for insertion into and removal from a valve body linearly, similar to the gate of a gate valve. It is a preassembled unit that does not rely on the valve body to hold its component parts together. Its component parts are fixed together (i.e., connected together) as a single unit that remains together when withdrawn from the valve body (preferably a single-piece support structure on which the valve-stopping element is mounted pivotally).

Suitably configured, the gate-like valve-stopping mechanism of this invention works with the insertion valve described in copending and commonly assigned U.S. patent application Ser. No. 10/376,552 (now U.S. Pat. No. 6,776,184 B1 issued Aug. 17, 2004) and with the repair-under-pressure valve described in copending and commonly assigned U.S. patent application Ser. No. 10/632,006 published Feb. 3, 2005 (Publication No. US-0022867-A1). The following illustrative drawings and detailed description make the foregoing and other objects, features, and advantages of the invention more apparent.

DESCRIPTION OF THE PREFERRED EMBODIMENTS

FIGS. 1–5 show various details of a valve assembly 10 constructed according to the invention. Generally, the valve assembly 10 includes a valve body 11 (FIGS. 1–3) and a valve-stopping mechanism 12 (FIGS. 2–5) mounted removably within the valve body 11. The valve body 11 is composed of metal or other suitably strong, rigid material and the valve-stopping mechanism 12 is composed of ductile iron or other suitable base material and could include encapsulation of the base material with rubber. The valve-stopping mechanism 12 fits within the valve body 11 where it functions as means for enabling a user to selectively open and close the valve assembly 10.

More specifically, the valve body 11 has first and second ends 13 and 14 and it defines a hollow valve body interior 15 or waterway (e.g., 24-inch inside diameter) that extends between the first and second ends 13 and 14 along a longitudinally extending first axis 16. The hollow valve body interior 15 couples the first and second ends 13 and 14 in fluid communications. The user operates the valve-stopping mechanism 12 to open and close the valve 10, opening it to enable such fluid communications and closing it to stop such fluid communications.

The valve body 11 includes an opening-defining portion 17 that defines an access opening 18. The access opening 18 (i.e., a passageway from the exterior to the interior of the valve body 11) provides access to the hollow valve body interior 15 along a second axis 19 that intersects the first axis 16. Preferably, the second axis 19 is perpendicular to the first axis 16. The valve-stopping mechanism 12 is shaped and dimensioned to fit in the access opening 18 so that the user can advance the valve-stopping mechanism 12 linearly through the access opening 18 along the second axis 19 into the hollow valve body interior 15 to the position illustrated in FIGS. 3 and 4. In other words, the valve-stopping mechanism 12 is mounted removably in the illustrated position within the hollow valve body interior 15. In that position, the valve-stopping mechanism 12 is disposed intermediate the first and second ends 13 and 14 in fluid-tight engagement of the valve body 11 so the valve-stopping mechanism 12 blocks fluid communications between the first and second ends 13 and 14, and in addition preferably blocks fluid communication into the hollow cavity (i.e., the access opening 18), except through a fluid-communications-providing opening 20 that is identified in FIG. 4.

Concerning the fluid-communications-providing opening 20, the valve-stopping mechanism 12 includes a valve-stopping-element support structure 21 that defines the opening 20. It is the support structure 21 portion of the valve-stopping mechanism 12 that is shaped and dimensioned to fit in the access opening 18 so that the user can advance the valve-stopping mechanism 12 linearly through the access opening 18 along the second axis 19 into the hollow valve body interior 15 to the position illustrated in FIGS. 3 and 4. In that position, it is the support structure 21 that blocks fluid communications between the first and second ends 13 and 14 and, in addition, preferably blocks fluid communication into the hollow cavity (i.e., the access opening 18) in the manner of a gate. Thus, it is the fluid-communications-providing opening 20 defined by the support structure 21 that provides fluid communications between the first and second ends 13 and 14.

Figure 4:
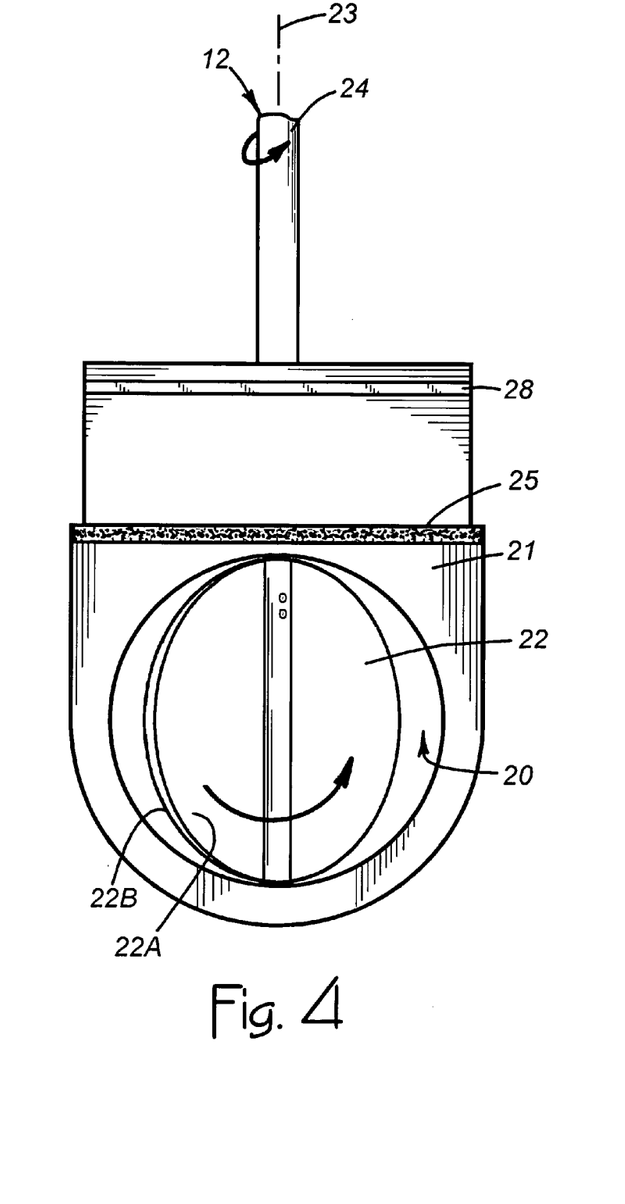
FIG. 4 is an elevation view similar to FIG. 3 of just the valve-stopping mechanism.
Figure 5:
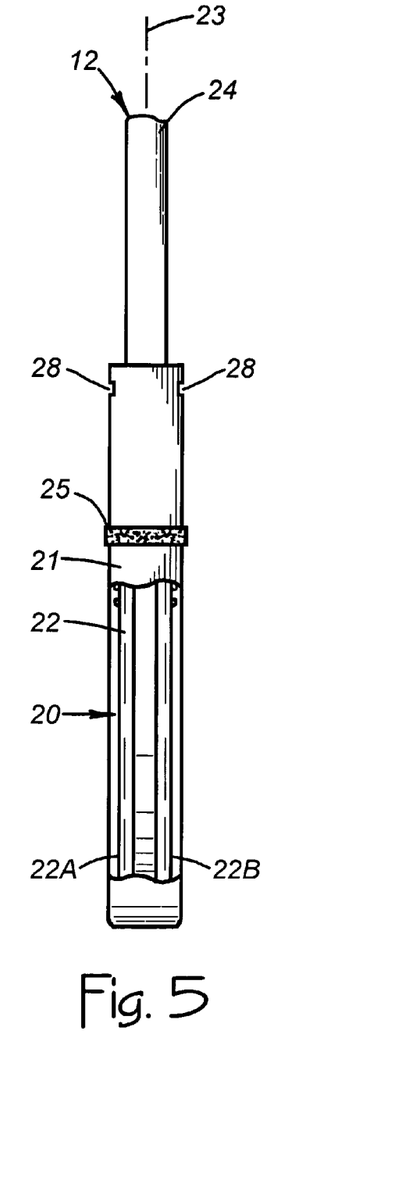
FIG. 5 is an elevation view similar to FIG. 2 of just the valve-stopping mechanism.

The support structure 21 supports a valve-stopping element 22. The valve-stopping element 22 is mounted pivotally on the support structure 21 for pivotal movement about a pivotal axis 23 of the valve-stopping mechanism 12. For the illustrated valve assembly 10, the pivotal axis 23 is aligned with the second axis 19 of the valve body 11 when the support structure 21 is mounted within the valve body 11 in the position illustrated in FIGS. 2 and 3. So mounted, the user can selectively pivot the valve-stopping element 22 (as indicated by the bold curved arrows in FIG. 4) by rotating a shaft 24 that is connected to the element 22. The shaft 24 extends rotatably through the support structure 21 to the element 22. The user rotates the shaft 24 about the pivotal axis 23 to pivot the valve-stopping element 22 between a first pivotal position of the element 22 in which the element 22 stops fluid communications between the first and second ends 13 and 14 through the fluid-communications-providing opening 20 (FIGS. 2, 3, and 5) and a second pivotal position of the element 22 in which the element 22 does not stop such fluid communications (FIG. 4). Thus, the opening 20 is a fluid-communications-providing opening in the sense that it provides fluid communications between opposite sides of the support structure 21 (i.e., between the first and second ends 13 and 14) when it is not blocked by the valve-stopping element 22.

Based upon the foregoing and subsequent descriptions, one of ordinary skill in the art can readily implement the invention with any of various forms of gate-like valve-stopping mechanism and with any of various forms of pivoting valve-stopping elements. The element 22 takes the form of a butterfly element (i.e., typically a flat, disc-shaped, valve-stopping element). The element 22 has opposite first and second faces 22A and 22B (FIGS. 2–5) extending parallel to the pivotal axis 23. In the closed position, the first face 22A faces the first end 13 of the valve body 11 while the second face 22B faces the second end 14. In the closed position, the first and second faces 22A and 22B extend transversely across the hollow valve body interior 15. In the open position, the element 22 is pivoted from the closed position (as much as ninety degrees) according to the desired flow rate. Thus, linear movement of the valve-stopping mechanism is not required to open and close the valve, and so the valve assembly 10 does not involve the size and space requirements of a sliding gate type of valve-stopping mechanism.

The illustrated valve-stopping mechanism 12 includes a resiliently deformable elastomeric seal 25 (FIGS. 2–5) that abuts the valve body 11 in fluid-tight sealing engagement. In addition, the valve-stopping-element support structure 21 can be at least partially rubber encapsulated so that it abuts the valve body 11 in fluid-tight sealing engagement. That arrangement effectively stops fluid communications between the first and second ends 13 and 14 and, in addition, preferably blocks fluid communication into the hollow cavity of the valve body 11 (i.e., the access opening 18), except through opening 20 in the support structure 21. Based upon the foregoing and subsequent descriptions, one of ordinary skill in the art can readily provide other suitable sealing arrangements within the inventive concepts disclosed.

Interiorly threaded holes 26 receive set screws or other threaded retaining screws (not shown) that extend through an upper portion 27 of the opening-defining portion 17 of the valve body 11 into channels or grooves 28 on opposite sides of the valve-stopping mechanism 12. That arrangement retains the valve-stopping mechanism 12 in position within the valve body 11. Just two threaded holes 26 are identified in FIG. 2 and just one threaded hole 26 is identified in each of FIGS. 1 and 3. Two grooves 28 are visible in FIGS. 2 and 5, while just one groove 28 is visible in each of FIGS. 3 and 4. Based upon the foregoing and subsequent descriptions, one of ordinary skill in the art can readily provide other suitable restraining arrangements within the inventive concepts disclosed. After the valve-stopping mechanism 12 is secured in position within the valve body 11, a cover plate 29 (FIGS. 1–3) is bolted onto the valve body over the access opening 18. The shaft 24 extends rotatably through a sealing component 30 in the cover plate 29 (FIG. 2).

Figure 1:
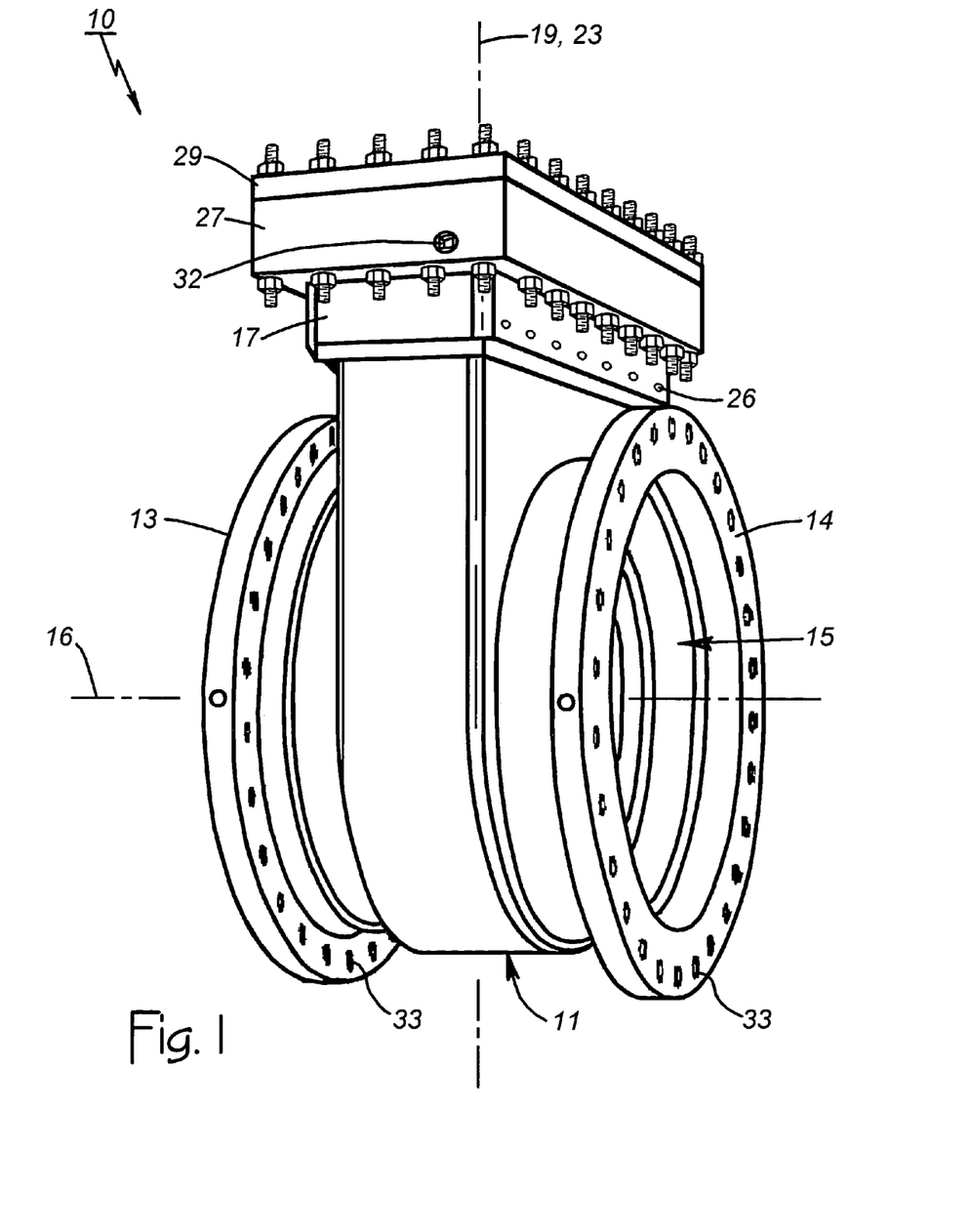
FIG. 1 of the drawings is an isometric view of a valve assembly constructed according to the invention, with a vertical and longitudinal axes illustrated for spatial reference purposes.
Figure 2:
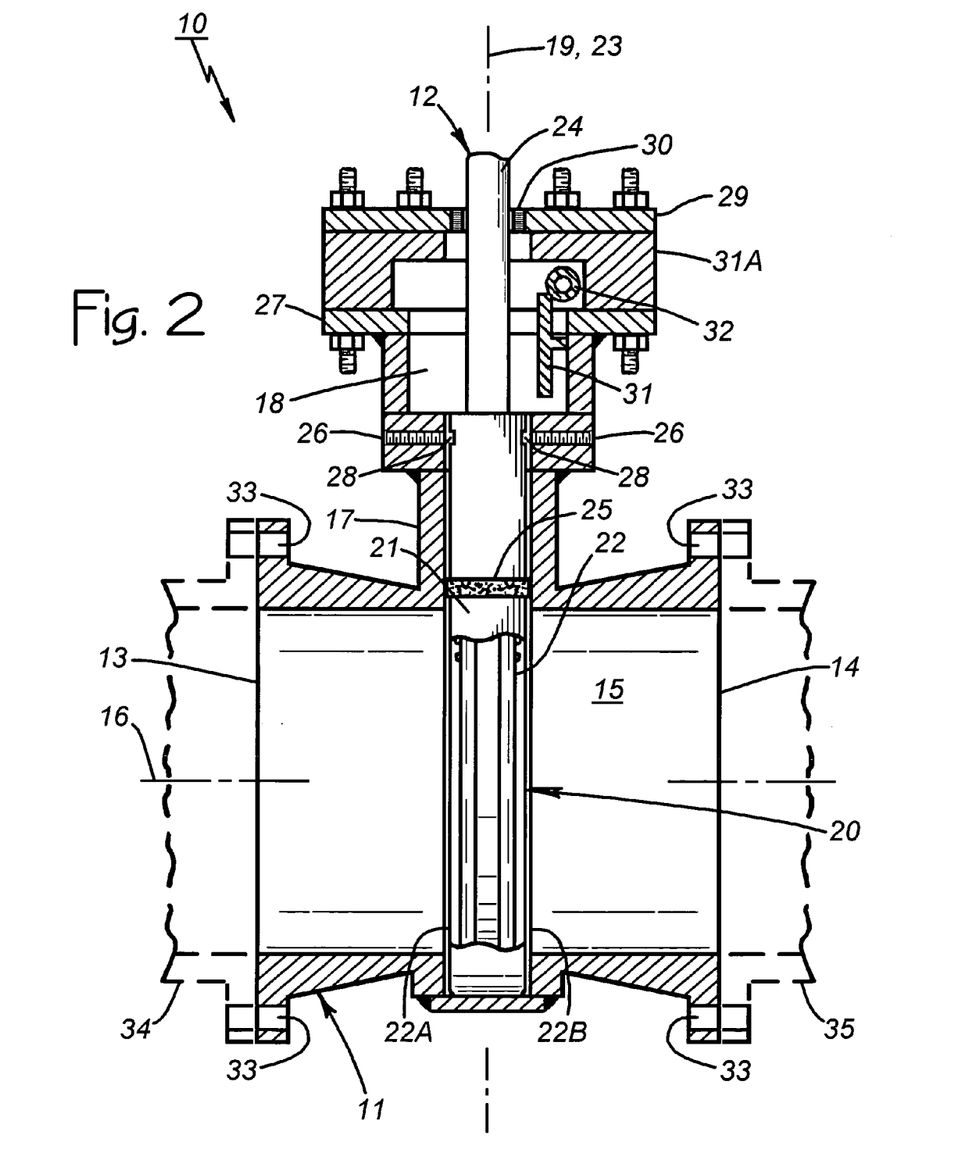
FIG. 2 is a view of the valve assembly with portions of the valve body in cross section as viewed in a vertical plane containing the vertical and longitudinal axes.
Figure 3:
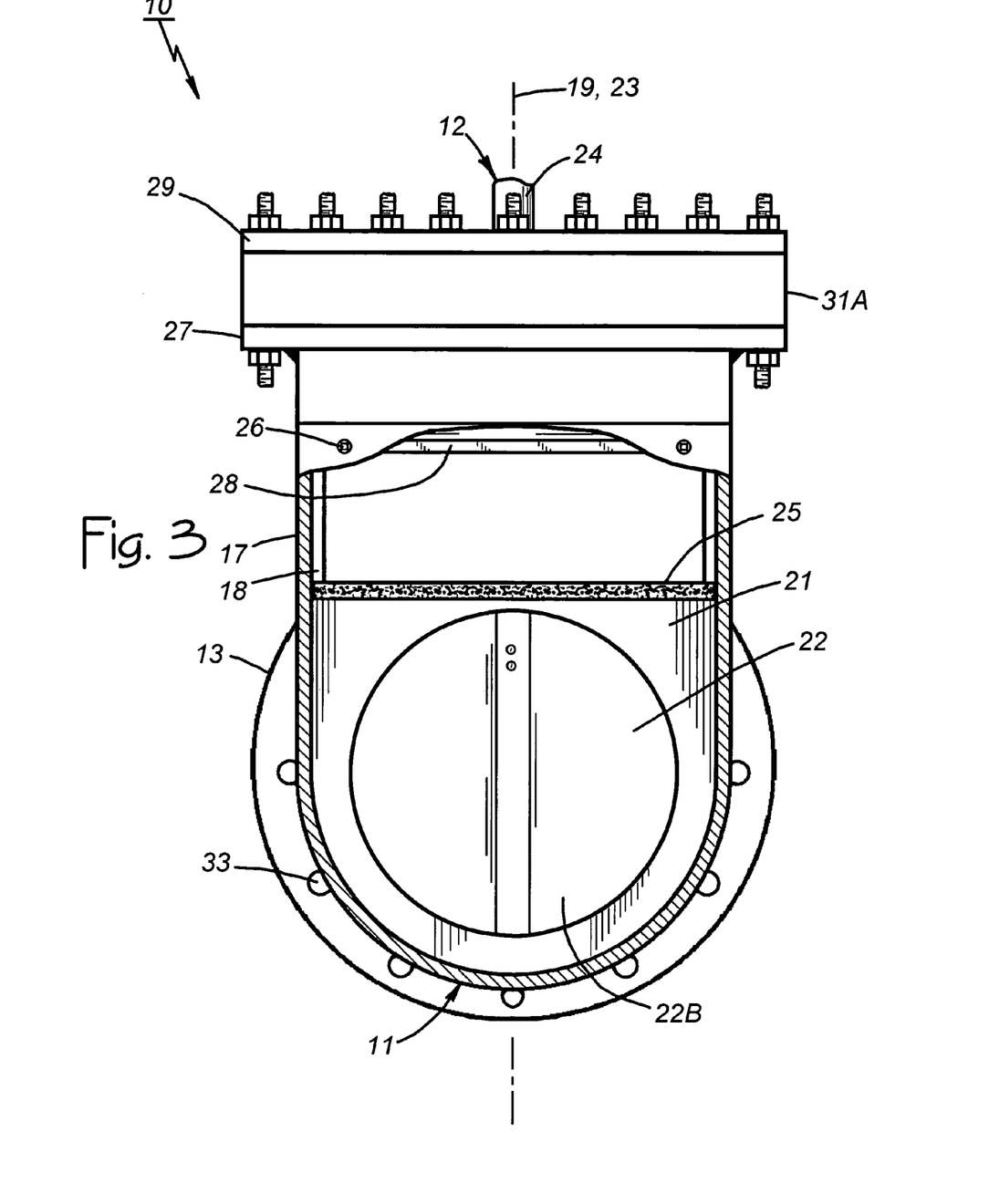
FIG. 3 is an elevation view of the valve assembly with portions of the valve body in cross section as viewed in a plane that is perpendicular to the longitudinal axis and that contains the vertical axis.

FIG. 2 also illustrates an optional or removable isolator mechanism 31A with an isolator plate referred to as a flap plate 31 that is pivotally mounted within the upper portion 27 of the opening-defining portion 17 or within the removable isolator 31A. The user turns a shaft 32 (FIGS. 1 and 2) to pivot the flap plate 31 ninety degrees from the open position illustrated in FIG. 2 to a closed position in which the flap plate 31 blocks fluid flow through the access opening 18. The flap plate 31 can be operated in future repair operations if the valve-stopping mechanism 12 ever needs to be repaired or replaced without a shut down of the system. Based upon the foregoing and subsequent descriptions, one of ordinary skill in the art can readily provide other suitable isolator arrangements within the inventive concepts disclosed. In addition, multiple bolt holes 33 are provided in the flanged first and second ends 13 and 14 of the valve body 11 (FIGS. 1–3) for use in bolting a hot-tap fitting flange 34 (FIG. 2) to the first end 13 and a downstream component 35 to the second end. Just a few bolt holes 33 are identified in FIGS. 1–3 for illustrative purposes.

Turning now to the diagrammatic representations in view FIGS. 6–12, they illustrate various steps in hot tapping a line with the valve assembly 10. The hot-tapping operation is similar in some respects to the methodology described in U.S. Pat. No. 5,660,199 and that patent is incorporated herein by reference for all the details it provides.

Figures 6, 7:
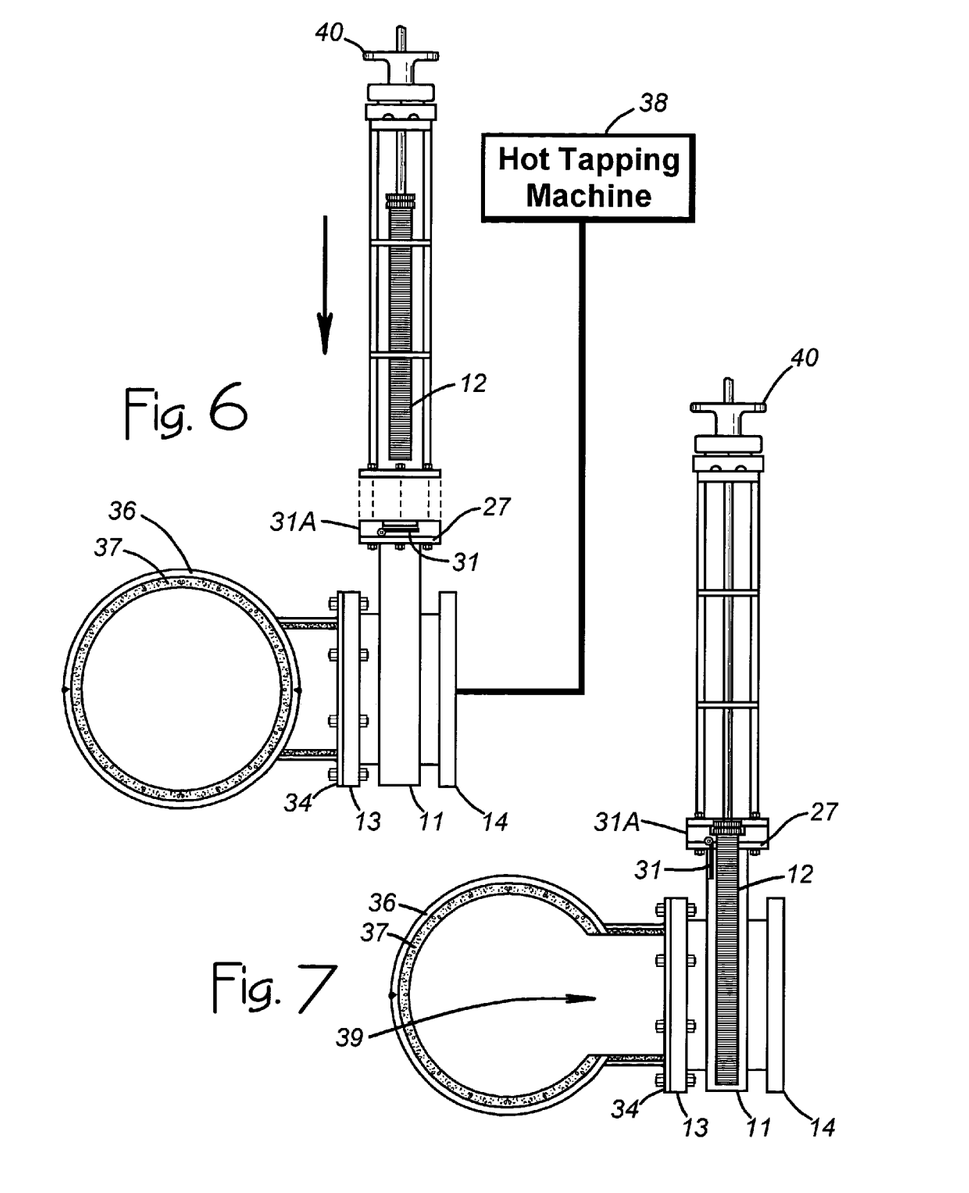
FIG. 6 through 12 are diagrammatic representations of various steps of the installation methodology used to install the valve assembly in an existing line containing fluid under pressure.

First, a hot-tapping fitting 36 is bolted, welded, or otherwise suitably connected to a section of pipe 37 in a pipeline that is to be tapped as depicted in the diagram of FIG. 6. The hot-tapping fitting 36 may take any of various known forms, including the illustrated saddle. It serves the function of providing the fluid-tight hot-tap fitting flange 34 discussed above with reference to FIG. 2 to which the first end 13 of the valve body 11 is bolted. With the hot-tapping fitting 36, the pipe 37 is hot tapped to form a hole 39 shown in FIGS. 7–9 using a hot-tapping machine 38 connected to the second end 14 of the valve body 11 (as described in greater detail in the patent referenced above).

Figures 10, 11, 12:
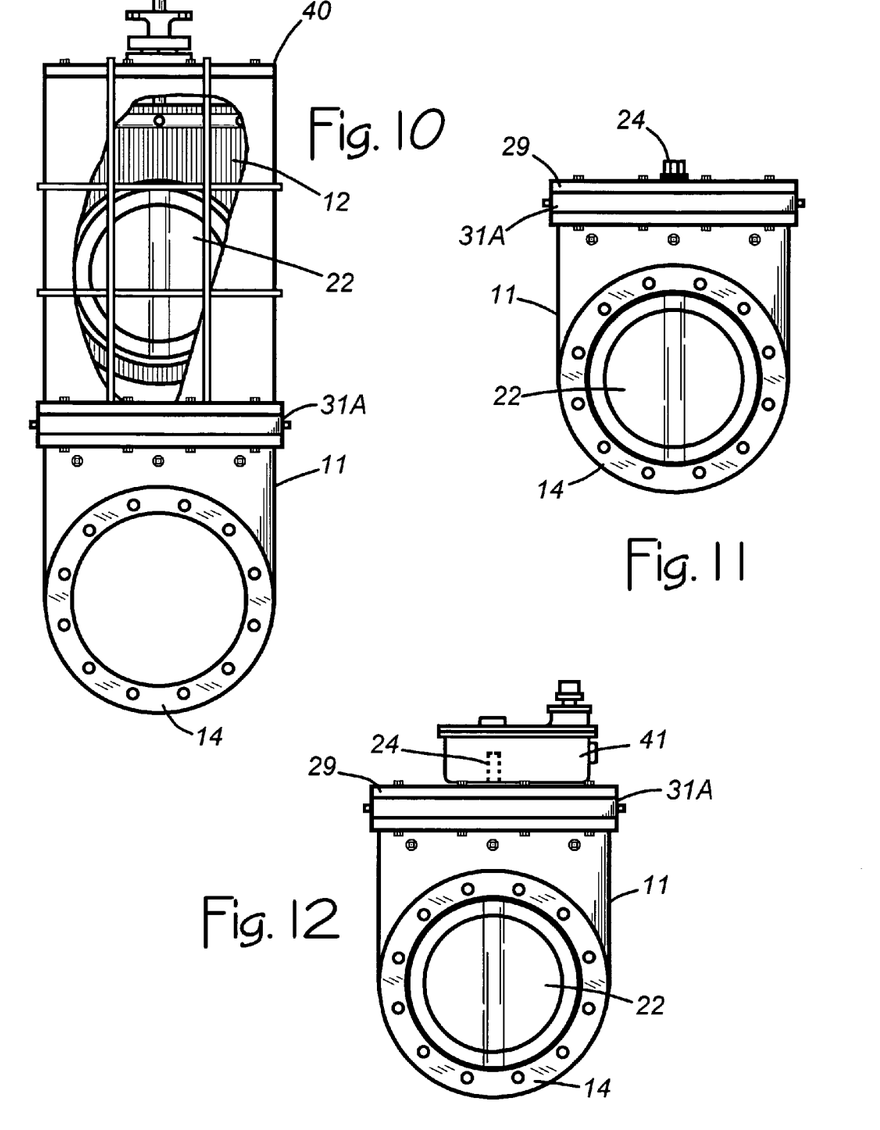

Prior to hot tapping the pipe 37, a temporary bonnet 40 is bolted onto the upper portion 27 of the valve body 11 with the valve-stopping mechanism 12 held within the fluid-tight temporary bonnet 40, as indicated by the downwardly directed arrow in FIG. 6. The temporary bonnet 40 with the valve-stopping mechanism 12 within it is also shown in the diagram of FIG. 10. With the temporary bonnet 40 bolted on, the flap plate 31, if used, is moved to the open position, the valve-stopping mechanism 12 is advanced linearly from the temporary bonnet 40 into the valve body 11 where it is secured with retainer screws or other suitable means as mentioned previously, and the hot-tapping machine 38 is removed after making sure the valve-stopping mechanism 12 is closed.

Figures 8, 9:
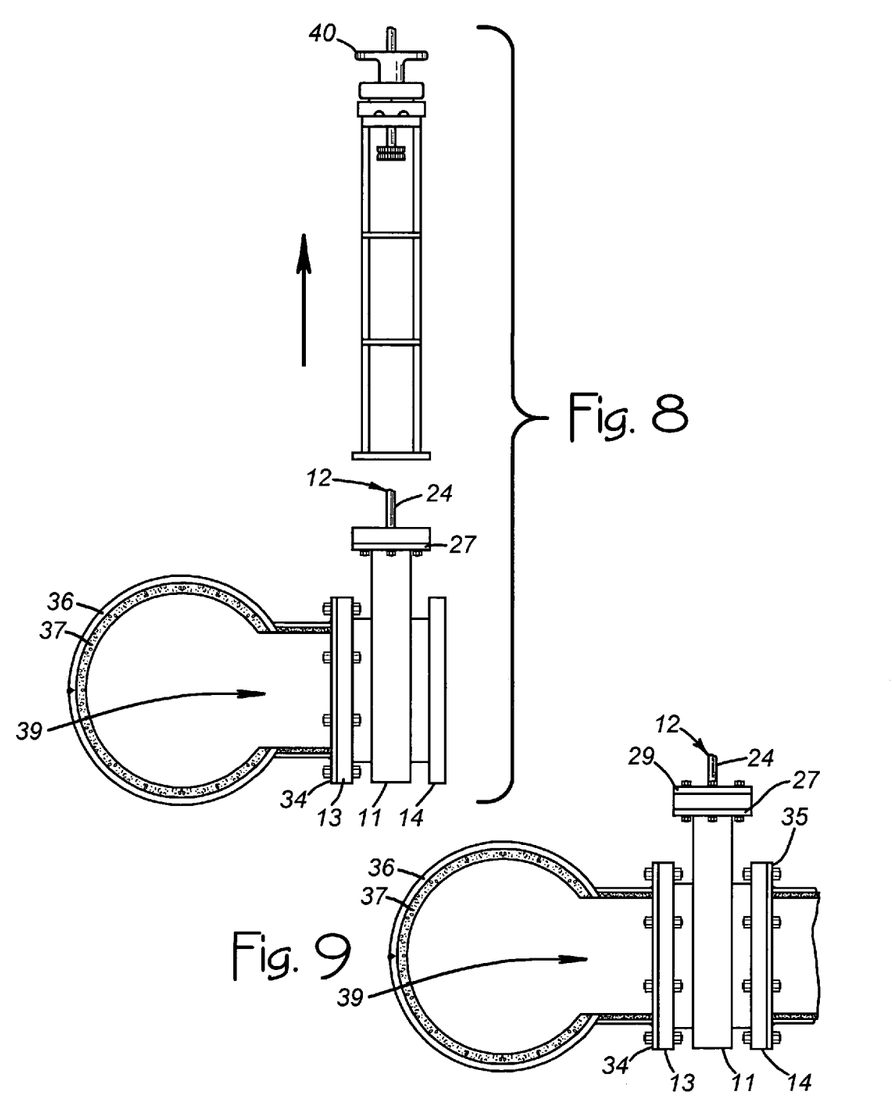

At this point in the procedure, the temporary bonnet 40 is unbolted and removed from the upper portion 27 (a permanent isolator or the temporary isolator 31A) as depicted by the upwardly directed arrow in the diagram of FIG. 8. If desired, the temporary isolator 31A is removed at this time. That results in the configuration depicted in the diagram of FIG. 7. The cover plate 29 is then bolted onto the upper portion 27, and the downstream component 35 mentioned previously with reference to FIG. 2 is bolted onto the second end 14 of the valve body 11 to result in the configuration depicted in the diagrams of FIGS. 9 and 11. Thereafter, a manual or powered gearbox 41 (FIG. 12) may be coupled to the shaft 24 for use in rotating the shaft 24.

Restating the methodology employed, a method for hot tapping a line according to the invention with a valve assembly as described above includes the step of connecting the first side of the valve body to a line to be tapped. The method proceeds by connecting a hot-tapping machine to the second side of the valve body and connecting a bonnet to the valve body over the access opening with the bonnet holding the valve-stopping mechanism in a position to be advanced through the access opening along the second axis into the hollow valve body interior. Next, the line is hot tapped through the valve body with the valve-stopping mechanism withdrawn from the hollow valve body interior, the valve-stopping mechanism is advanced along the second axis to a position within the hollow valve body interior intermediate the first and second ends of the valve body, and the hot-tapping machine is disconnected from the valve body with the valve-stopping element pivoted to the first position of the valve-stopping element that stops fluid communications between the first and second ends and into the linear access opening so the use of a temporary bonnet and isolator plate can be removed at this time. Thereafter, a downstream component and a gearbox may be added.

One apparent advantage to the invention is that the user can change, repair, or replace the valve's stopping mechanism without interruption of the pipeline system at a later date, after the hot tapping process had taken place. In order to accomplish this, the gearbox is removed, the cover plate is removed, and a temporary isolator plate or flap plate is installed, or, if a permanent flap plate or other isolator valve is attached to the valve body, it is opened. The temporary bonnet is bolted to the isolator valve in a fluid-tight manner. The threaded retaining screws or other retaining mechanism are operated to release the restraint of the valve-stopping mechanism. Next, the valve-stopping mechanism is removed linearly up through the access opening into the temporary hollow bonnet cavity. The temporary or permanent isolator valve or flap plate assembly is closed in fluid-tight engagement. The temporary bonnet and then the valve-stopping mechanism are removed for repair or replacement.

To re-install the new or rebuilt valve-stopping mechanism, the valve-stopping mechanism is re-installed into the temporary bonnet cavity and mounted on the permanent or temporary isolator valve or flap plate assembly in a fluid-tight engagement. The isolator valve is opened so that the valve-stopping mechanism can be installed linearly into the valve body. Once installed, the valve-stopping mechanism seals the passage of fluid through the valve body and through the linear access opening of the valve body. The restraining mechanism is activated to retain the valve-stopping mechanism. The temporary bonnet mechanism is removed and the isolator valve can be removed at this time. If there is a permanent isolator plate attached to the valve body, it is left open. The cover plate is re-installed and the gearbox is installed, allowing the completion of the repair process.

Thus, the method of this invention overcomes the gate-valve problems of existing hot-tapping procedures and equipment. The gate-like valve-stopping mechanism inserts linearly, but the valve-stopping element pivots instead of moving linearly into and out of the valve body so that the space otherwise required by a sliding gate valve to open and close the valve is not needed. In addition, a gate-like valve-stopping mechanism that includes a pivoting valve-stopping element can be used instead of a sliding gate in other valves, such as an insertion valve (IV), as described in copending and commonly assigned U.S. patent application Ser. No. 10/376,552, and a repair-under-pressure (RUP) valve, as described in copending and commonly assigned U.S. patent application Ser. No. 10/632,006 published Feb. 03, 2005. Both of those patent applications are incorporated herein by reference, together with U.S. Pat. No. 6,776,184 issued from the first application (i.e., U.S. patent application Ser. No. 10/376,552), for all the details provided as additional support for the related claims subsequently presented.

The support structure of the gate-like valve-stopping mechanism (also referred to as an isolator retaining structure) rides inside and seals against the internal valve body cavity in the manner of a typical gate. The valve-stopping element (or isolator) held by the support structure (i.e., a butterfly valve-stopping element) is mounted pivotally on the support structure so that the components of the valve-stopping mechanism are all fixed together as a complete unit or cartridge for ease of installation and removal under pressure. The support structure and a bonnet attached to the support structure, or packing structure attached to the bonnet, can incorporate one or more fluid-tight seals as needed. Mating sealing surfaces on the valve body interior result in rubber-to-metal, metal-to-plastic, plastic-to-plastic, or metal-to-metal fluid-tight seals, although any of various different combinations of materials and compounds can be used according to the type of fluid or chemicals being transferred through the valve. Preferably, the support structure (the isolator retaining structure) can be rubber encapsulated with a ridged metal butterfly valve-stopping element (isolator) and the support structure sealing against, or in mating engagement of a ridged internal valve body that may include protective coatings.

With the support structure (the isolator retaining structure) installed within the valve body, fluid can only pass through the opening in the support structure (i.e., the fluid-communications-providing opening) when the valve-stopping element (the isolator) is in an open position. The support structure provides a pivot point for the isolator and includes a seating surface for the valve-stopping element that results in a fluid-tight seal when the isolator is in a closed position. Suitable means (e.g., a shaft extending from the isolator) enables operation of the isolator from a non-pressurized location outside the valve body. Seals along the shaft provide fluid-tight sealing, and a separate packing gland may be provided for final sealing of the shaft. Various known gear and/or powered operators can be connected to the shaft to selectively turn the shaft and thereby pivot the isolator as desired.

A butterfly valve-stopping element (isolator) can take the shape of a somewhat flat, round butterfly paddle. Fluid flows on opposite sides of the paddle and through the fluid-communications-providing opening in the isolator support structure when the paddle is in an open position. Rotating the shaft ninety degrees, moves the isolator between fully open and fully closed positions. The butterfly isolator is preferably solid and can incorporate sealing materials such as rubber or Teflon for sealing purposes. The isolator can be any of various known materials, including steel, stainless steel, ductile iron, and plastics that result in a fluid-tight seal when contacting mating surfaces on the isolator support structure in the closed position. The isolator support structure can incorporate rubber, Teflon, or any of various other known materials in order to seal against mating surfaces of the valve body.

Figure 13A:
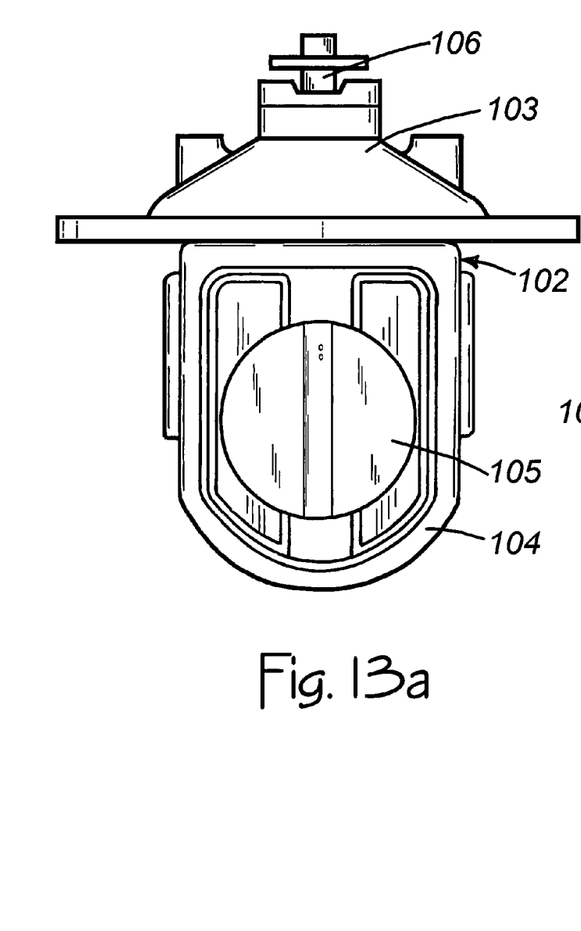
FIG. 13a is an elevation view of a second valve-stopping mechanism.
Figure 13B:
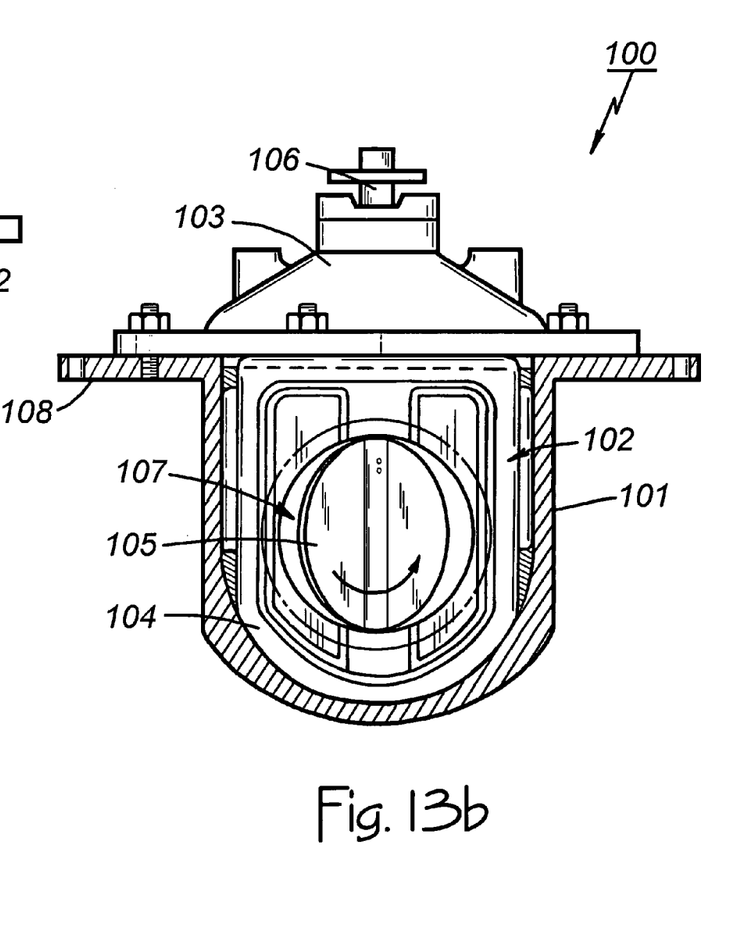
FIG. 13b is an elevation view of the second valve-stopping mechanism assembled with a second valve body to form a second valve assembly constructed according to the invention.

FIGS. 13a and 13b show some details of a valve 100 for hot tapping a line. It can be used for hot tapping a line instead of the valve 10 described earlier. It can also be used as a repair-under-pressure valve as described in U.S. patent application Ser. No. 10/632,006 that is incorporated herein by reference. The valve 100 includes a valve body 101 and a gate-like valve-stopping mechanism 102 (a gate-like butterfly cartridge) with an attached bonnet 103. FIG. 13a shows just the valve-stopping mechanism 102 with the attached bonnet 103 apart from the valve body 101, while FIG. 13b shows the valve-stopping mechanism 102 installed in the valve body 101.

The valve-stopping mechanism 102 includes a support structure 104 and a valve-stopping element 105 (an isolator element) mounted pivotally on the support structure 104. The action of a user turning a shaft 106 ninety degrees (the shaft 106 being connected to the valve-stopping element 105), causes the valve-stopping element 105 to pivot ninety degrees (as indicated by a bold arrow overlying the element 105 in FIG. 13b). It pivots between closed and open positions in order to thereby selectively stop and unstop fluid communications through a fluid-communications-providing opening 107 in the support structure 104 (FIG. 13b). A flange 108 extends beyond the bonnet 103 to serve as connection-facilitating means for facilitating the connection of a temporary bonnet that is used during installation and removal of the valve-stopping mechanism 102 under pressure, or for facilitating the connection of a temporary isolation valve during repair under pressure.

Figure 14A:
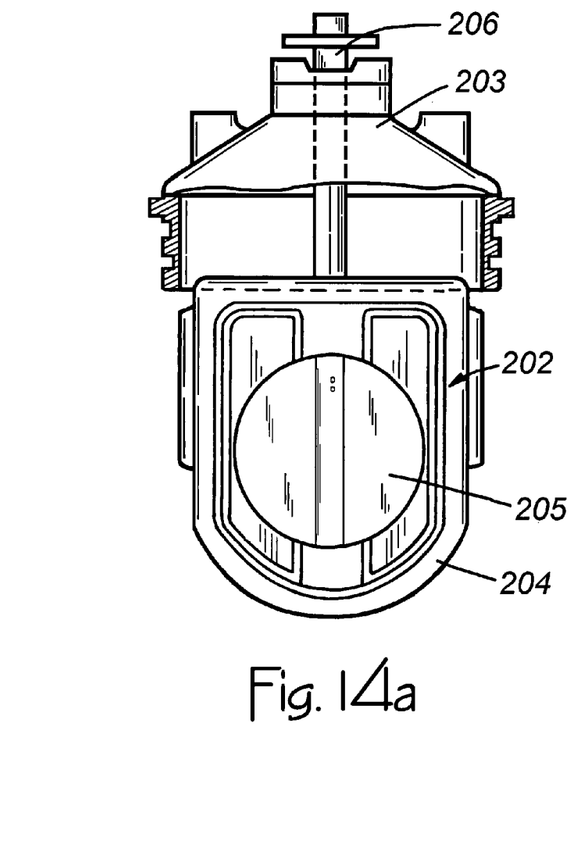
FIG. 14a is an elevation view of a third valve-stopping mechanism.
Figure 14B:
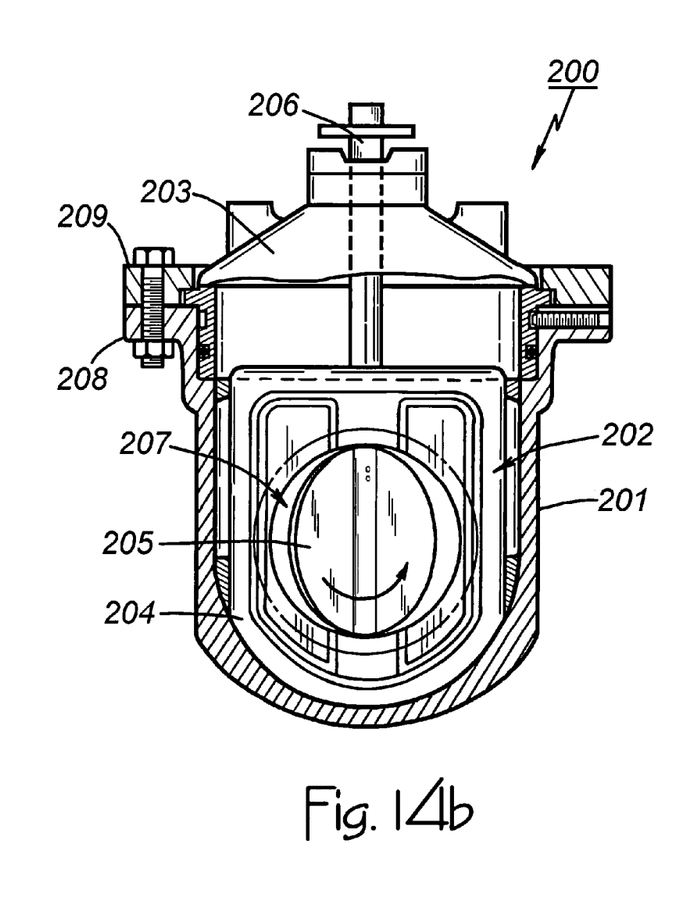
FIG. 14b is an elevation view of the third valve-stopping mechanism assembled with a third valve body to form a third valve assembly constructed according to the invention.

FIGS. 14a and 14b show details of a valve 200 that can be used as a repair-under-pressure valve, as described in U.S. patent application Ser. No. 10/632,006, and for hot tapping a line instead of the valve 10 described earlier. The valve 200 includes a valve body 201 and a gate-like valve-stopping mechanism 202 (a gate-like butterfly cartridge) with an attached bonnet 203. FIG. 14a shows just the valve-stopping mechanism 202 with the attached bonnet 203, apart from the valve body 201, while FIG. 14b shows the valve-stopping mechanism 202 installed in the valve body 201.

Similar to the valve-stopping mechanism 102 described above, the valve-stopping mechanism 202 includes a support structure 204 and a valve-stopping element 205 mounted pivotally on the support structure 204. Turning a shaft 206 ninety degrees causes the valve-stopping element 105 to pivot between closed and open positions in order to thereby selectively stop and unstop fluid communications through a fluid-communications-providing opening 207 in the support structure 204 (FIG. 14b). A flange 208 serves as connection-facilitating means for facilitating the connection of a temporary isolation valve during repair under pressure, or for facilitating the connection of a temporary bonnet that is used during installation and removal of the valve-stopping mechanism 202 when hot tapping a line. Removing a retainer ring 209 (FIG. 14*b*) exposes the flange 208 for use as such connection-facilitating means.

Figure 15A:
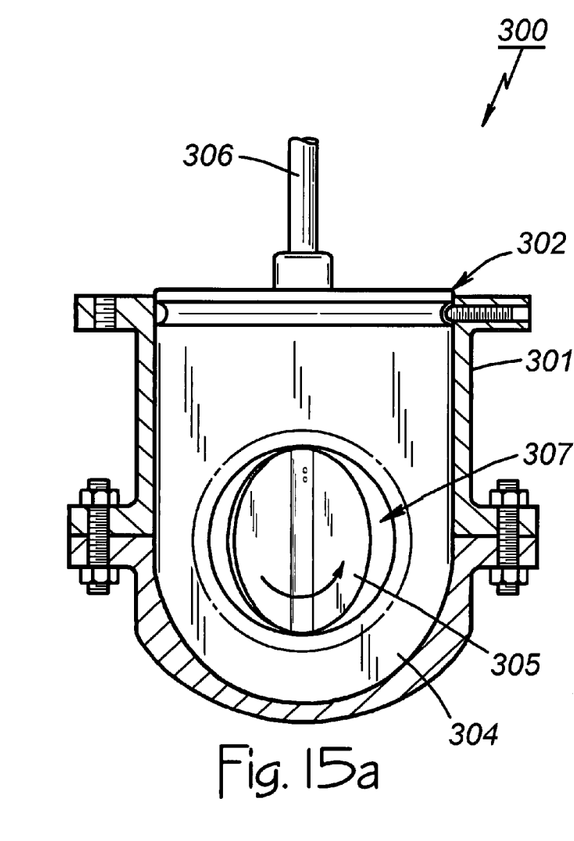
FIG. 15a is an elevation a fourth valve-stopping mechanism.
Figure 15B:
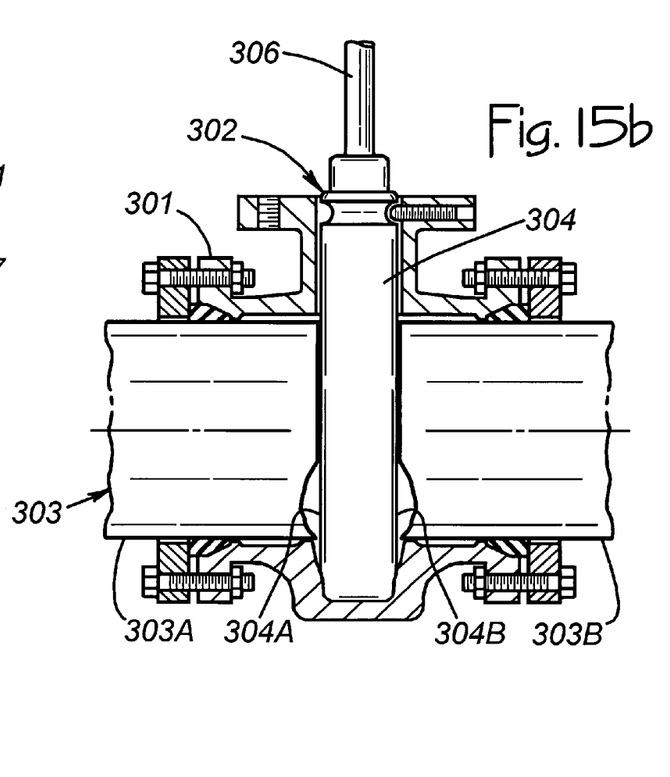
FIG. 15b is an elevation view of the fourth valve-stopping mechanism assembled with a fourth valve body to form a fourth valve assembly constructed according to the invention.

FIGS. 15*a* and 15*b* show details of a valve 300 that can be used as an insertion valve as described in U.S. patent application Ser. No. 10/376,552 (now U.S. Pat. No. 6,776,184). The valve 300 includes a valve body 301 and a gate-like valve-stopping mechanism 302 (a gate-like butterfly cartridge). FIG. 15*a* shows just the valve 300, while FIG. 15*b* shows the valve 300 installed on an existing pipe 303. The valve body 301 is adapted to be assembled over the pipe 303 before a gap is cut in the pipe 303 to form an upstream section 303A and a downstream section 303B. A gap is cut in the pipe 303 as described in the U.S. patent application Ser. No. 10/376,552 referenced above.

Similar to the valve-stopping mechanisms 102 and 103 described above, the valve-stopping mechanism 302 includes a support structure 304 and a valve-stopping element 305 mounted pivotally on the support structure 304. Turning a shaft 306 ninety degrees causes the valve-stopping element 305 to pivot between closed and open positions in order to thereby selectively stop and unstop the fluid communications flow through a fluid-communications-providing opening 307 in the support structure 304 (FIG. 15*a*). In addition to the bonnet-less valve-stopping mechanism 302 as illustrated, bonneted valve-stopping mechanisms, with bonnets similar to the bonnets 103 and 203, can be utilized for inserting valves. For this particular valve 300, the support structure 304 seals against the valve body 301 but can also include opposite upstream and downstream faces 304A and 304B that are shaped and dimensioned to seat against respective ones of the upstream and downstream sections 303A and 303B to effect a fluid tight seal, without needing to rely on fluid-tight engagement of the valve body 301. Portions of the upstream and downstream sections 303A and 303B are broken away in FIG. 15*b* for illustrative convenience in order to expose the upstream and downstream faces 304A and 304B. In an alternative arrangement (not shown), the support structure 304 is configured to seat in a fluid-tight seal against the valve body 301, with or without sealing against the upstream and downstream sections 303A and 303B.

Thus, the invention provides a valve assembly having a linearly installed but pivotally operated valve-stopping mechanism so that the space required for moving a gate linearly into and out of the valve body is not needed to open and close the valve. It is needed only during installation and removal. Although exemplary embodiments have been shown and described, one of ordinary skill in the art may make many changes, modifications, and substitutions without necessarily departing from the spirit and scope of the invention.

What is claimed is:

1. A valve assembly, comprising:
a valve body having first and second ends and a hollow valve body interior extending along a first axis between the first and second ends;
an opening-defining portion of the valve body that defines an access opening providing access to the hollow valve body interior along a second axis that intersects the first axis; and
a gate-like valve-stopping mechanism within the hollow valve body interior, the gate-like valve-stopping mechanism including a valve-stopping-element support structure and a valve-stopping element on the valve-stopping-element support structure, said valve-stopping-element support structure defining a fluid-communications-providing opening;
the valve-stopping-element support structure being shaped and dimensioned to enable a user to move the valve-stopping-element support structure linearly through the access opening along the second axis to a position within the hollow valve body interior intermediate the first and second ends; and
the valve-stopping element being mounted pivotally on the valve-stopping-element support structure for pivotal movement about the second axis between a first position of the valve-stopping element in which the valve-stopping element stops fluid communications between the first and second ends through the fluid-communications-providing opening and a second position of the valve-stopping element in which the valve-stopping element does not stop such fluid communications.

2. A valve assembly as recited in claim 1, wherein the valve-stopping element is a butterfly element.

3. A valve assembly as recited in claim 1, wherein the valve-stopping-element support structure of the valve-stopping mechanism includes a base material that is at least partially rubber encapsulated for sealing purposes.

4. A valve assembly as recited in claim 1, wherein the valve-stopping-element support structure of the valve-stopping mechanism includes an attached bonnet.

5. A valve assembly as recited in claim 1, wherein the valve-stopping-element support structure of the valve-stopping mechanism includes opposite first and second faces that are adapted to provide fluid-tight engagement of a pipe on which the valve assembly is installed.

6. A valve assembly, comprising:
a valve body having first and second ends and a hollow valve body interior extending along a first axis between the first and second ends;
an opening-defining portion of the valve body that defines an access opening providing access to the hollow valve body interior along a second axis that intersects the first axis; and
a gate-like valve-stopping mechanism within the hollow valve body interior, the gate-like valve-stopping mechanism including a valve-stopping-element support structure and a valve-stopping element on the valve-stopping-element support structure, said valve-stopping-element support structure defining a fluid-communications-providing opening;
the valve-stopping-element support structure being shaped and dimensioned to enable a user to move the valve-stopping-element support structure linearly through the access opening along the second axis to a position within the hollow valve body interior intermediate the first and second ends; and
the valve-stopping element being mounted pivotally on the valve-stopping-element support structure for pivotal movement about the second axis between a first position of the valve-stopping element in which the valve-stopping element stops fluid communications between the first and second ends through the fluid-communications-providing opening and a second position of the valve-stopping element in which the valve-stopping element does not stop such fluid communications;

said valve assembly further comprising a flap plate mechanism for enabling a user to selectively open and close the access opening.

7. A valve assembly, comprising:

a valve body having first and second ends and a hollow valve body interior extending along a first axis between the first and second ends;

an opening-defining portion of the valve body that defines an access opening providing access to the hollow valve body interior along a second axis that intersects the first axis; and a gate-like valve-stopping mechanism within the hollow valve body interior, the gate-like valve-stopping mechanism including a valve-stopping-element support structure and a valve-stopping element on the valve-stopping-element support structure, said valve-stopping-element support structure defining a fluid-communications-providing opening;

the valve-stopping-element support structure being shared and dimensioned to enable a user to move the valve-stopping-element support structure linearly through the access opening along the second axis to a position within the hollow valve body interior intermediate the first and second ends; and the valve-stopping element being mounted pivotally on the valve-stopping-element support structure for pivotal movement about the second axis between a first position of the valve-stopping element in which the valve-stopping element stops fluid communications between the first and second ends through the fluid-communications-providing opening and a second position of the valve-stopping element in which the valve-stopping element does not stop such fluid communications;

said valve assembly further comprising a cover plate mounted removably on the opening-defining portion of the valve body in a position over the access opening.

8. A valve assembly, comprising:

a valve body having first and second ends and a hollow valve body interior extending along a first axis between the first and second ends;

an opening-defining portion of the valve body that defines an access opening providing access to the hollow valve body interior along a second axis that intersects the first axis; and a gate-like valve-stopping mechanism within the hollow valve body interior, the gate-like valve-stopping mechanism including a valve-stopping-element support structure and a valve-stopping element on the valve-stopping-element support structure, said valve-stopping-element support structure defining a fluid-communications-providing opening;

the valve-stopping-element support structure being shaped and dimensioned to enable a user to move the valve-stopping-element support structure linearly through the access opening along the second axis to a position within the hollow valve body interior intermediate the first and second ends; and the valve-stopping element being mounted pivotally on the valve-stopping-element support structure for pivotal movement about the second axis between a first position of the valve-stopping element in which the valve-stopping element stops fluid communications between the first and second ends through the fluid-communications-providing opening and a second position of the valve-stopping element in which the valve-stopping element does not stop such fluid communications;

wherein the valve-stopping-element support structure of the valve-stopping mechanism includes a locking arrangement for restraining the valve-stopping mechanism within the access opening in fluid-tight engagement of the valve body.

9. A valve assembly, comprising:

a valve body having first and second ends and a hollow valve body interior extending along a first axis between the first and second ends;

an opening-defining portion of the valve body that defines an access opening providing access to the hollow valve body interior along a second axis that intersects the first axis; and a gate-like valve-stopping mechanism within the hollow valve body interior, the valve-stopping mechanism including a butterfly-element-supporting structure and a butterfly element on the butterfly-element-supporting structure, said butterfly-element-supporting structure defining a fluid-communications-providing opening;

the butterfly-element-supporting structure being movable through the access opening along the second axis to a position within the hollow valve body interior intermediate the first and second ends; and the butterfly element being mounted pivotally on the butterfly-element-supporting portion for pivotal movement about the second axis between a first position of the butterfly element in which the butterfly element stops fluid communications between the first and second ends through the fluid-communications-providing opening and a second pivotal of the butterfly element in which the butterfly element does not stop such fluid communications.

10. A method for hot tapping a line, comprising:

providing a valve assembly that includes (i) a valve body having first and second ends and a hollow valve body interior extending along a first axis between the first and second ends, (ii) an opening-defining portion of the valve body that defines an access opening providing access to the hollow valve body interior along a second axis that intersects the first axis, and (iii) a valve-stopping mechanism having a valve-stopping element and a valve-stopping-element support structure mounted removably within the hollow valve body interior such that the valve-stopping-element support structure is movable linearly through the access opening along the second axis to a position within the hollow valve body interior intermediate the first and second ends and such that the valve-stopping element is mounted pivotally on the valve-stopping element supporting structure for pivotal movement about the second axis between a first position of the valve-stopping element in which the valve-stopping element stops fluid communications between the first and second ends through the opening and a second position of the valve-stopping element in which the valve-stopping element does not stop such fluid communications;

connecting the first side of the valve body to the line, connecting a hot-tapping machine to the second side of the valve body, and connecting a bonnet to the valve body over the access opening with the bonnet holding the valve-stopping mechanism in a position to be advanced through the access opening along the second axis into the hollow valve body interior;

hot tapping the line through the valve body with the valve-stopping mechanism withdrawn from the hollow valve body interior;

advancing the valve-stopping mechanism along the second axis to a position within the hollow valve body interior intermediate the first and second ends of the valve body; and disconnecting the hot-tapping machine from the valve body with the valve-stopping element pivoted to the first position of the valve-stopping element that stops fluid communications between the first and second ends.

11. A method as recited in claim 10, further comprising providing a cover plate and capping the access opening with the cover plate.

12. A valve assembly for insertion in a line formed by an existing pipe of predetermined outside diameter containing fluid under pressure, the valve assembly comprising:

a first subassembly that includes a valve body having opposite first and second ends, a valve body axis extending between the first and second ends, and a bonnet-supporting flange intermediate the first and second ends that defines an access opening facing radially away from the valve body axis, the valve body being adapted to be assembled over the existing pipe so that the pipe extends along the valve body axis between the first and second ends of the valve body and so that a user can access the pipe within the valve body through the access opening for purposes of cutting and removing a section of the existing pipe in order to form a gate-receiving gap in the pipe; and a second subassembly that includes a bonnet having a gate and a flange-mating portion, the bonnet being adapted to function as means for moving the gate structure through the access opening into the valve body, between an open position of the gate structure in which the first and second ends of the valve body are in fluid communication and a closed position of the gate in which the gate extends through the gate-receiving gap in the pipe and into fluid-tight engagement of the valve body such that the first and second ends of the valve body are not in fluid communication;

wherein the flange-mating portion of the bonnet defines a gate opening through which the gate extends from the bonnet in a fluid-tight fit; and wherein the flange-mating portion of the bonnet fits into the access opening in a fluid-tight fit;

thereby enabling a user to mount the bonnet on the valve body through a temporary isolation valve mounted on the bonnet-supporting flange in order to facilitate insertion of the valve assembly when the existing pipe contains fluid under pressure;

wherein said first and second ends of the valve body are not connected to each other solely by valve body structure that is rotatable about the valve body axis independent of the first and second ends;

wherein said first and second ends of the valve body are not rotatable about the valve body axis relative to each other;

wherein said bonnet-supporting flange is not rotatable about the valve body axis relative to the first and second ends;

wherein the access opening is sufficiently large to receive a hole-cutting element having an outside diameter no smaller than the predetermined outside diameter of the pipe as the hole-cutting element advances radially relative to the valve body axis through the access opening toward the pipe;

wherein the valve body defines a hollow interior that is sufficiently large to receive the hole-cutting element as the hole-cutting element rotates and advances radially entirely through the pipe to form the gate-receiving gap in the pipe;

wherein the gate is adapted to extend, in the closed position of the gate, through the gate-receiving gap in the pipe and into direct fluid-tight engagement of the valve body without needing to rely on contact with the pipe to effect a seal; and wherein the gate includes a valve-stopping-element support structure and a valve-stopping element mounted pivotally on the valve-stopping-element support structure, said support structure defining a fluid-communications-providing opening;

the valve-stopping-element support structure being shaped and dimensioned to enable a user to move the valve-stopping-element support structure linearly through the access opening to a position within the hollow valve body extending through the gap in the pipe; and the valve-stopping element being mounted pivotally on the valve-stopping-element support structure for pivotal movement between a first position of the valve-stopping element in which the valve-stopping element stops fluid communications through the fluid-communications-providing opening and a second position of the valve-stopping element in which the valve-stopping element does not stop such fluid communications.

13. A valve assembly for insertion in a line formed by an existing pipe of predetermined outside diameter that contains fluid under pressure, the valve assembly comprising:

a first subassembly that is adapted to be assembled together over the pipe to form a valve body on the pipe having a valve body axis along which the valve body and the pipe extend and a flange portion that defines an access opening facing radially outward from the valve body axis; and a second subassembly that includes a gate-like valve-stopping mechanism, which second subassembly is adapted to be mounted on the valve body and extend into the access opening after a gap has been cut in the pipe in order to function as means for selectively stopping the flow of fluid through the valve body;

wherein the access opening is sufficiently large to receive a hole-cutting element having an outside diameter no smaller than the predetermined outside diameter of the pipe as the hole-cutting element advances radially relative to the valve body axis through the access opening toward the pipe; and wherein the valve body defines a hollow interior that is sufficiently large to receive the hole-cutting element as the hole-cutting element rotates and advances radially entirely through the pipe to form a gap in the pipe; and wherein the valve-stopping mechanism includes a gate-like valve-stopping-element support structure with a fluid-communications-providing opening and a valve-stopping element mounted pivotally on the valve-stopping-element support structure;

the valve-stopping-element support structure being shaped and dimensioned to enable a user to move the valve-stopping-element support structure linearly through the access opening to a position within the hollow valve body extending through the gap in the pipe; and the valve-stopping element being mounted pivotally on the valve-stopping-element support structure for pivotal movement between a first position of the valve-stopping element in which the valve-stopping element stops fluid communications through the fluid-communications-providing opening and a second position of the valve-stopping element in which the valve-stopping element does not stop such fluid communications.

14. A valve as recited in claim 13, wherein the valve-stopping mechanism is adapted to extend through the gap in the pipe into direct fluid-tight engagement of the valve body.

15. A valve as recited in claim 13, wherein the valve-stopping mechanism is adapted to extend through the gap in the pipe into direct fluid-tight engagement of the pipe.

16. A valve, comprising:

a valve body having first and second ends, the valve body defining a hollow valve body interior extending between the first and second ends that couples the first and second ends in fluid communications;

an opening-defining portion of the valve body that defines an access opening in the valve body;

isolator means for enabling a user to selectively stop and unstop fluid communications between the first and second ends of the valve body, including a valve-stopping mechanism removably mounted within the access opening; and connection-facilitating means on the opening-defining portion of the valve body for facilitating the fluid-tight removable connection of a separate isolation valve assembly to the opening-defining portion of the valve body in a position over the access opening that enables the user to remove the valve-stopping mechanism from the access opening through the isolation valve assembly;

wherein the valve-stopping mechanism includes a gate-like valve-stopping-element support structure and a valve-stopping element mounted pivotally on the valve-stopping-element support structure, said valve-stopping-element support structure defining a fluid-communications-providing opening;

the valve-stopping-element support structure being shaped and dimensioned to enable a user to move the valve-stopping-element support structure linearly through the access opening to a position within the hollow valve body extending through the gap in the pipe; and the valve-stopping element being mounted pivotally on the valve-stopping-element support structure for pivotal movement between a first position of the valve-stopping element in which the valve-stopping element stops fluid communications through the fluid-communications-providing opening and a second position of the valve-stopping element in which the valve-stopping element does not stop such fluid communications.

* * * * *